United States Patent Office 3,266,331
Patented August 16, 1966

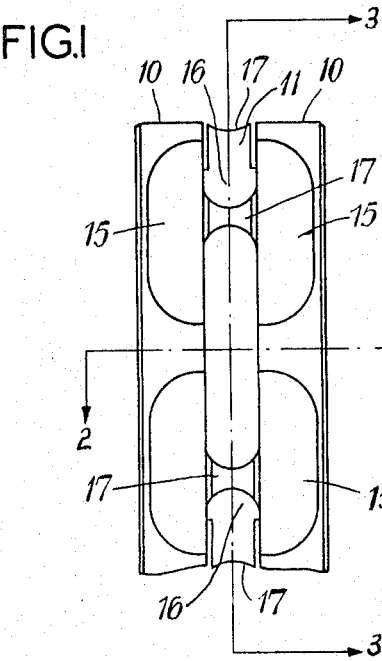
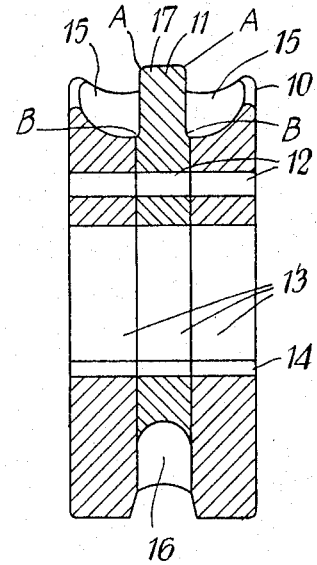
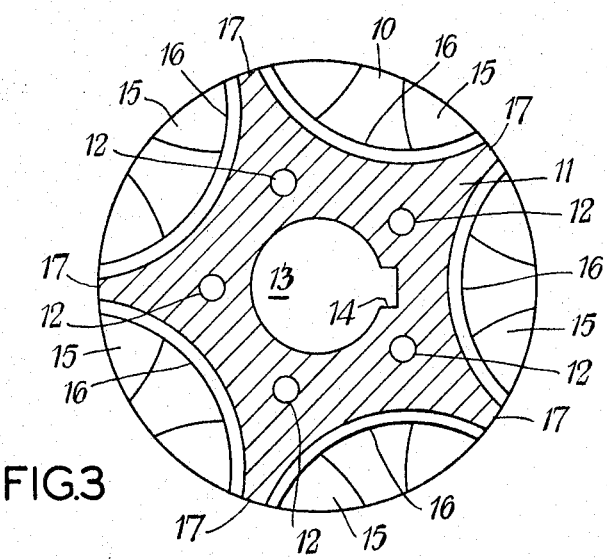

3,266,331
SPROCKET WHEELS
Arthur Thomas Charles Burrows, Stevenage, England, assignor to Geo. W. King Limited, Hertfordshire, England, a British company
Filed July 6, 1964, Ser. No. 380,272
Claims priority, application Great Britain, July 23, 1963, 29,209/63
2 Claims. (Cl. 74—243)

This invention is concerned with sprocket wheels or chains and more particularly although not necessarily exclusively with chain sprocket wheels for hoists and the like.

According to the invention a sprocket wheel is provided around its periphery with a series of pockets or recesses so designed and arranged as to accommodate or to provide seatings for successive chain links, it being appreciated that the plane of each link will be disposed at right angles or substantially at right angles to the plane of the preceding or succeeding link.

In further accordance with the invention a sprocket wheel will comprise an inner disc portion and two side plate or disc portions between which said inner disc portion is disposed, the inner disc portion being formed around its periphery with a plurality of recesses serving to define or produce a plurality of equally angularly spaced spurs or teeth while each outer disc portion is provided on its inner face with a series of equally angularly spaced recesses corresponding in number to the recesses on said inner disc portion, the arrangement being such that in the complete sprocket wheel corresponding recesses in said outer disc portions are aligned or in register thereby to provide around the periphery of said wheel a succession of equally angularly spaced pockets each capable of accommodating or providing a seating for a chain link disposed in a plane of the sprocket wheel while the recesses in the inner disc portion are staggered in relation to those of said outer disc portions so that each spur or tooth will be disposed substantially centrally of the length of a separate one of the aforesaid pockets to engage any chain link accommodated in the latter, the recesses in said inner disc portion serving to accommodate the adjoining links which will be disposed in the plane of the sprocket.

For a better understanding of the invention reference will now be made to the accompanying drawings which show one embodiment by way of example and in which:

FIGURE 1 is an end or edge view of a sprocket wheel,
FIGURE 2 is a section on the line 2—2 of FIGURE 1,
FIGURE 3 is a section on the line 3—3 of FIGURE 1.

Referring to the drawings it will be seen that the sprocket wheel therein illustrated comprises two identical side plates or discs 10 and an inner spur disc 11, the parts being adapted to be rigidly assembled together to form the complete sprocket. Each of the side plates or discs 10 and the spur disc 11 is formed with a plurality of apertures 12, there being five such apertures in the embodiment illustrated and the arrangement being such that on assembly of the sprocket, corresponding apertures in the respective discs will be brought into register to allow for the insertion of securing pins or the like. Additionally each of said plates or discs 10 and the spur disc 11 will also be formed with a central aperture 13 and a keyway 14 adapted to accommodate a supporting shaft or spindle and a key or the like whereby the sprocket may be keyed to said shaft or spindle to rotate therewith. Each of the side plates or discs 10 is of circular form and is provided at its inner face with a series of arcuate recesses 15, the shape of which will be appreciated on reference to the three figures of the drawings. As will be seen corresponding recesses 15 in the side plates or discs will be aligned thereby to provide a succession of pockets around the periphery of the sprocket wheel, each such pocket being adapted to accommodate or provide a seating for a chain link disposed in a plane at right angles or substantially at right angles to the plane of the sprocket. The spur disc 11 is provided with a plurality of arcuate recesses 16 corresponding in number to the number of recesses 15 in the side plates or discs 10, such recesses 16 serving to define or produce a plurality of spurs or teeth 17. The recesses 16 are also of arcuate shape in cross section as is clearly illustrated in FIGURE 3 while the edges of the spurs or teeth 17 will be slightly radiused or rounded as indicated at A and B, FIGURE 3, in order to obviate the presence of any sharp corners such as might result in undesired wear on the links of any chain passing around the sprocket. As will be seen from FIGURE 2, the arrangement is such that on assembly of the sprocket the spurs or teeth 17 will be located centrally with respect to the length of the pockets formed by the recesses 15 in the side plates or discs 10. The formation and relative arrangement of the recesses 15, 16 in the side plates or discs 10 and the inner disc 11 is such that any chain link actually engaged by a spur or tooth 17 and lying in a plane at right angles to the plane of the spur wheel will seat or be accommodated in the pocket formed by the appropriate recesses 13 of the side plates or discs 10 while portions of the adjoining links on either side of such engaged link, which adjoining links will be disposed in planes at right angles to that of said engaged link and thus in the plane of the spur wheel, will seat or be accommodated in the arcuate recesses 16 of the spur disc 11.

While in the embodiment illustrated the sprocket wheel is made in three parts which are subsequently fixedly secured together it may well be feasible or desirable to form the whole sprocket as a single piece e.g. a single casting.

I claim:
1. A sprocket wheel comprising:
   an inner disc portion having a plurality of arcuate recesses formed about its periphery and with a plurality of equally spaced spurs positioned around the periphery of the disc and between each of said plurality of arcuate recesses,
   an outer disc portion positioned on each side of said inner disc portion, said outer disc portions having facing, aligned arcuate recesses corresponding with the number of recesses in said inner disc portion, said arcuate recesses formed by said outer disc portions being staggered in relation to said arcuate recesses of said inner disc portion, whereby successive chain links at right angles to each other will be seated in the separate arcuate recesses of said inner and outer discs with said spurs engaging the alternate chain links which are lying in the plane of the peripheral surface of said sprocket wheel.

2. A sprocket wheel as in claim 1 wherein said inner and outer disc portions are integral whereby the sprocket wheel comprises a single piece.

References Cited by the Examiner

UNITED STATES PATENTS

| | | | |
|---|---|---|---|
| 415,080 | 11/1889 | Whitney | 74—243 X |
| 564,760 | 7/1896 | Perry | 74—243 X |
| 2,535,985 | 12/1950 | Manney | 74—243 |

FOREIGN PATENTS

| | | |
|---|---|---|
| 829,691 | 1/1952 | Germany. |
| 648,940 | 1/1951 | Great Britain. |

DAVID J. WILLIAMOWSKY, *Primary Examiner.*

DON A. WAITE, *Examiner.*

J. A. WONG, *Assistant Examiner.*